Patented Oct. 30, 1951

2,573,001

UNITED STATES PATENT OFFICE 2,573,001

ALLYL 3:5-HEXADIENOATE AND METHOD FOR PRODUCING IT

Maurice Louis Auguste Fluchaire and Georges Collardeau, Lyon, France, assignors to Societe des Usines Chimiques Rhone-Poulenc, Paris, France, a French body corporate No Drawing. Application March 25, 1949, Serial No. 83,516. In France April 20, 1948

3 Claims. (Cl. 260—486)

This invention relates to the production and use of an allyl compound and polymers thereof.

In co-pending application Serial No. 87,844 corresponding to French application No. 553,649, filed in France April 20, 1948, a process is described in which the esters of dienic monoacids with allyl or substituted allyl alcohols are pre-polymerised into the form of substantially non-volatile viscous products which are soluble in normal organic solvents and which are themselves readily oxidisable, for example under the action of atmospheric oxygen, into the form of hard, stable products which are insoluble in normal solvents. Such pre-polymerised products can therefore be used as varnishes without further treatment.

It has now been found, and this forms the subject of the present invention, that the new compound allyl 3:5-hexadienoate, has properties similar to those of the esters referred to in the said co-pending application, i. e. it can be pre-polymerised to form viscous products which are soluble or partially soluble in organic solvents and which are oxidisable, under the action of atmospheric oxygen, into the form of hard insoluble polymers. These properties render the products suitable for industrial applications, such as the preparation of varnishes and of compositions suitable for moulding.

Allyl 3:5-hexadienoate can be prepared by the general methods commonly employed for the production of esters, for example by the direct action of 3:5-hexadienoic acid on allyl alcohol, or by the action of allyl halides on the alkali salts of 3:5-hexadienoic acid.

Allyl 3:5-hexadienoate can be pre-polymerised in the same way as other allyl esters of dienic monoacids, the polymerisation of which is described in the co-pending application referred to above. Similarly, the pre-polymer obtained can be polymerised subsequently into the form of hard insoluble products by oxidation in air.

The pre-polymers and polymers are capable of the same industrial applications as the pre-polymers and polymers described in the co-pending application referred to above.

The following example, in which the parts are understood to be by weight, will serve to illustrate the present invention, but is not to be regarded as limiting it in any way.

Example

A distillation apparatus is charged with 7 parts by weight of 3:5-hexadienoic acid, 15 parts by weight of allyl alcohol, 25 parts by weight of benzene and 0.37 part by weight of sulphuric acid (66° Bé.) and the mixture is distilled. The lower aqueous layer of the distillate is recovered and the upper layer is returned into the apparatus. After distillation for one hour, esterification is complete.

The ester distils between 75° and 78.5° C. under a pressure of 8 mm. of mercury. $n_D^{17}=1.479$.

It is to be noted that the allyl 3:5-hexadienoate thus obtained may contain a little allyl sorbate. It is known, in fact, that 3:5-hexadienoic acid tends to isomerise to form sorbic acid under the action of alkalies or acids. Allyl sorbate does have similar polymerisation properties to allyl 3:5-hexadienoate and its presence has no substantial effect on the polymerisation of the product.

An addition of 5% by weight of benzoyl peroxide is made to the allyl 3:5-hexadienoate thus obtained and the mixture is heated for 4 hours in a sealed tube in an atmosphere of carbon dioxide. A viscous liquid is obtained which is soluble in organic solvents.

This pre-polymer is diluted with toluene and 1% of cobalt resinate is added thereto. The resulting solution, when spread on a metal support, and allowed to dry in the air for 24 hours at room temperature, yields a hard transparent film which adheres well to the support and is insoluble in common organic solvents.

We claim:
1. Allyl 3:5-hexadienoate.
2. A process for the production of allyl 3:5-hexadienoate which comprises reacting 3:5-hexadienoic acid with allyl alcohol.
3. A process for the production of allyl 3:5-hexadienoate which comprises reacting an allyl halide with an alkali salt of 3:5-hexadienoic acid.

MAURICE LOUIS AUGUSTE FLUCHAIRE.
GEORGES COLLARDEAU.

REFERENCES CITED

The following references are of record in the file of this patent:

UNITED STATES PATENTS

| Number | Name | Date |
|---|---|---|
| 843,401 | Kronstein | Feb. 5, 1907 |

OTHER REFERENCES

Paul et al., Bulletin de la Societe Chimique de France, Jan.-Feb., 1948 M, pp. 108 to 112.